(12) United States Patent
Laughlin

(10) Patent No.: US 6,779,934 B2
(45) Date of Patent: Aug. 24, 2004

(54) PRINTER HAVING A SPELL CHECKING FEATURE

(75) Inventor: John D. Laughlin, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 301 days.

(21) Appl. No.: 10/061,418

(22) Filed: Oct. 25, 2001

(65) Prior Publication Data

US 2003/0081973 A1 May 1, 2003

(51) Int. Cl.[7] .................................................. B41J 5/30
(52) U.S. Cl. .......................... 400/63; 400/62; 400/74; 715/533
(58) Field of Search ................................ 400/61–63, 65, 400/70, 74, 76, 695; 715/531–533

(56) References Cited

U.S. PATENT DOCUMENTS

| | | | | |
|---|---|---|---|---|
| 4,818,131 A | * | 4/1989 | Sakai | ........................... 400/63 |
| 4,995,740 A | * | 2/1991 | Kobayashi | .................... 400/63 |
| 5,745,911 A | * | 4/1998 | Sugiyama | .................... 715/533 |
| 6,028,853 A | * | 2/2000 | Haartsen | ..................... 370/338 |
| 6,275,709 B1 | * | 8/2001 | Do | ............................. 455/461 |
| 6,424,983 B1 | * | 7/2002 | Schabes et al. | ............. 715/533 |

FOREIGN PATENT DOCUMENTS

JP          03134768 A  *  6/1991          ........... G06F/15/20

* cited by examiner

*Primary Examiner*—Minh H Chau

(57) ABSTRACT

A print apparatus having a spell checking feature has a processor and a memory for storing a spell checking program. A computer coupled to the print apparatus may be used to instruct the print apparatus to spell check a document file before printing the document file. The print apparatus incorporates the results of the spell check into the printed document by highlighting, bolding or underlining the misspelled words. Alternatively, the print apparatus operates like a network server to provide spell checking services to the computer and/or to a plurality of computers coupled to the print apparatus via a computer network.

18 Claims, 5 Drawing Sheets

PRINTER HAVING A SPELL CHECKING FEATURE

The present invention generally relates to a printer having enhanced features, and more particularly to a printer adapted to provide print services and further adapted to provide spell checking services.

Computer-based word processing software packages continue to grow in sophistication. For example, many software packages include a variety of integrated features intended to enhance the document creation process, such as a spell checking feature that allows a user to check a document for spelling errors. However, many software packages do not include an integrated spell checking feature and, therefore, do not allow a user to perform an automatic spell check of a document file.

In addition, personal digital assistants (PDAs) are becoming more widely used and, with the advent of wireless communication systems like Bluetooth, allow PDA users to access print services offered by a printer. Unfortunately, PDA's typically include a limited amount of memory and are not able to support an enhanced software feature such as a spell checking feature. Thus, PDA users, although able to print a document at a printer, are unable to check the spelling of a document stored in the PDA.

SUMMARY OF THE INVENTION

The present invention is directed to a print apparatus having a spell checking feature that enables spell checking of the terminology in a computer-generated document. The print apparatus includes a processor for executing a spell checking program and a memory for storing the spell-checking program. The print apparatus may also be coupled to a computer network to provide a plurality of computers that are coupled to the network with access to the spell checking program.

DETAILED DESCRIPTION

Figure 1:
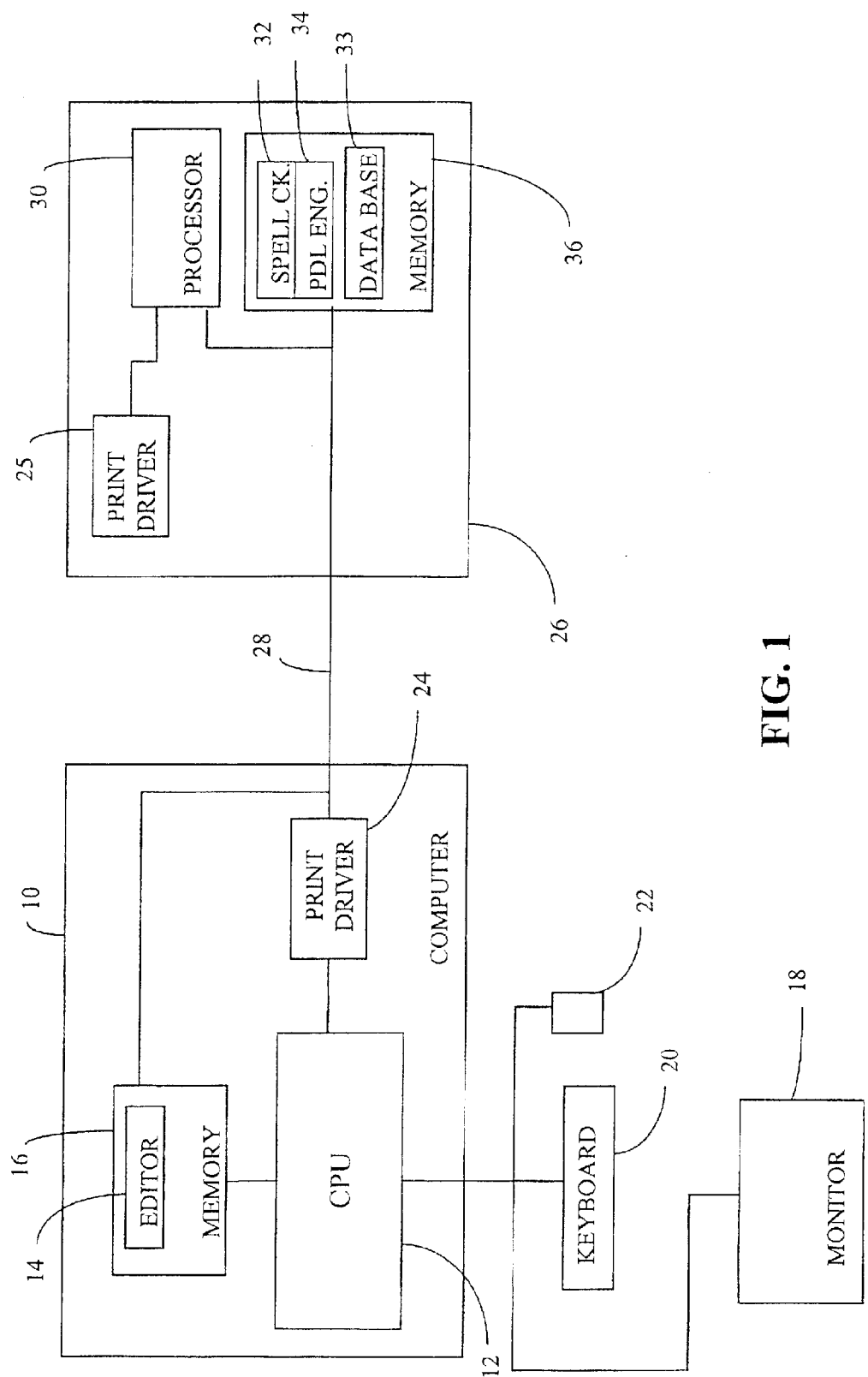
FIG. 1 is a block diagram of a print apparatus that is coupled to a user's computer and that provides the user with a spell checking program according to one aspect of the present invention.

Referring now to the drawings wherein like reference numerals refer to similar or identical parts throughout the several views, and more specifically to FIG. 1 thereof, a computer 10 includes a central processing unit (CPU) 12 that executes an editor program 14 to enable the creation, formatting and editing of computer-generated documents that are stored as document files in a memory 16. A monitor 18, keyboard 20 and mouse 22 enable communication between a user and the CPU 12. Although not shown in FIG. 1, the computer 10 may further include any number of peripheral devices including, for example, a modem, a sound card, a video card, etc. Further, the computer 10 need not be a stationary device but may be implemented using a laptop computer or even with a personal digital assistant (PDA). Moreover, the computer 10 may include a wireless communication device (not shown) that enables wireless communication.

A print driver 24 is also coupled to the CPU 12 for formatting document files stored in the memory 16 for printing at a print apparatus, such as a printer 26, which is coupled to the computer 10 via, for example, a printer cable 28. Specifically, the print driver 24 converts document files to a page description language format before causing the document files to be transmitted to the printer 26 for printing. As will be understood by one having ordinary skill in the art, a document file converted to a page description language format includes information required by the printer 26 to enable printing of the document file at the printer 26.

The printer 26 includes a processor 30 that executes a set of software programs stored in a memory 36, including, for example, a spell checking program 32 and a page description language engine program 34. The spell checking program 32, when executed by the processor 30, checks the accuracy of the spelling of a set of terms included in a document file by comparing the terms to the contents of a database 33 containing a dictionary of terms. The dictionary database 33, which may be integrated with the spell checking program 32, is also stored in the memory 36 and may be tailored to include language associated with a specific industry. For example, the database may include technical terms associated with the medical profession thereby making the spell checking program 32 suitable for usage in the medical profession. Alternatively, the database may include technical terms associated with any desired industry, including, the computer industry, the electronics industry, the telecommunications industry, the banking industry, etc.

The page description language engine program 34 formats document files provided to the printer 26 in a page description language format for printing at a print engine 25. Although described herein as separate software programs, the spell checking program 32 may be incorporated into the page description language program 34. Further, the page description language engine program 34 and the spell checking program 32 may be implemented using software, hardware, firmware and/or a combination thereof. In addition, software programs that enable communication between the printer 26 and the computer 10 and that further enable the printing of documents supplied to the printer 26 by the computer 10 may also be stored in the memory 36.

The print engine 25 is coupled to and controlled by the processor 30 and operates to print document files. The print engine 25 may be implemented using any conventional print engine adapted to perform conventional printing functions.

The printer 26, instead of being physically coupled to the computer 10 may be wirelessly coupled to the computer 10. Specifically, the printer 26 may include a wireless communication device (not shown) that enables communication with the wireless communication device (not shown) disposed in the computer 10. In addition, the computer 10 and printer 26 may communicate using a wireless communication protocol such as Bluetooth.

Figure 2:
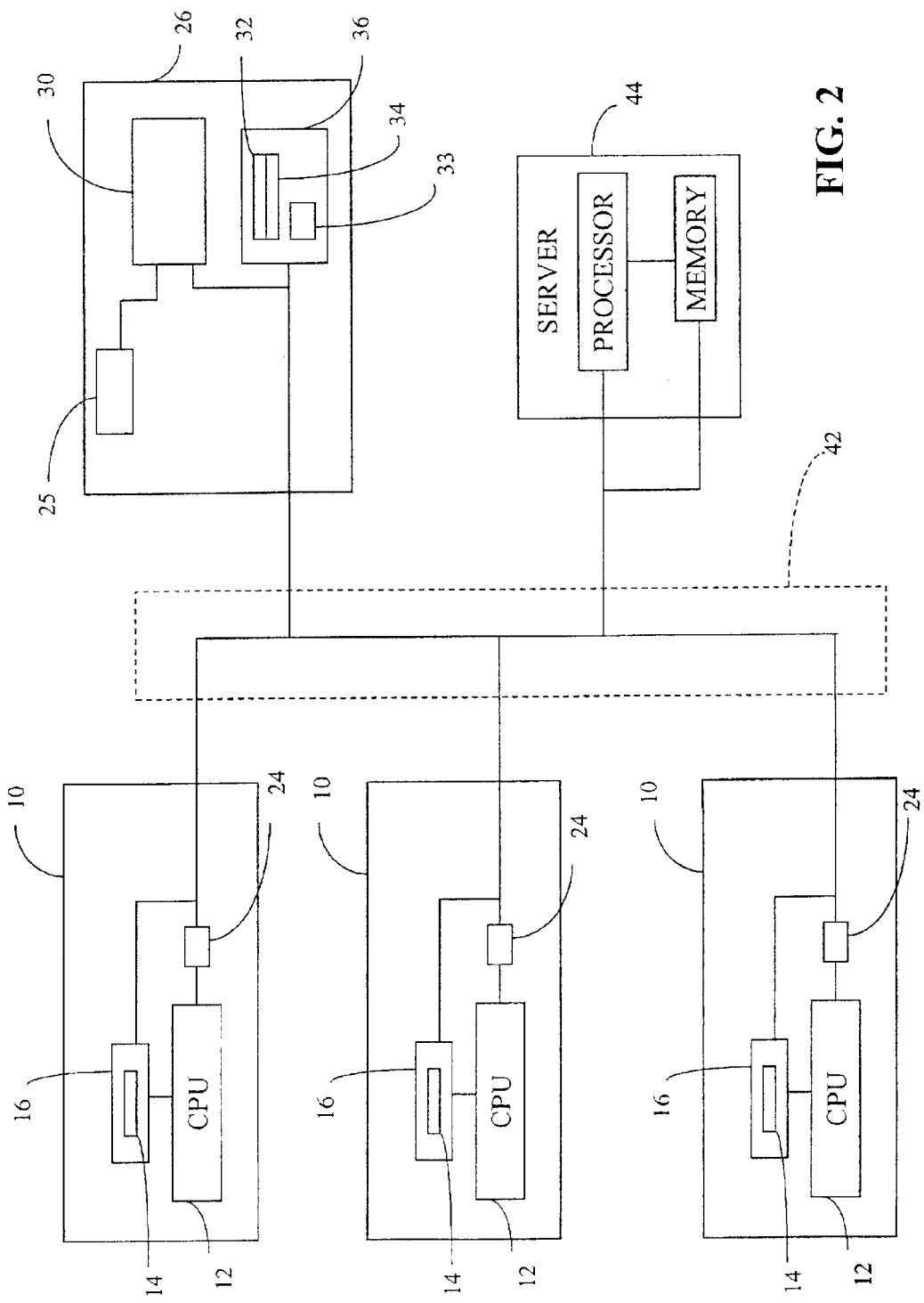
FIG. 2 is a block diagram of a print apparatus that is coupled to a set of users' computers via a communication network and that provides the set of users' computers with a spell checking feature according to another aspect of the present invention.

Referring now to FIG. 2, in a second embodiment, the computer 10 may comprise one of a plurality of computers 10 coupled to a communication network 42 that is controlled by a network server computer 44. In addition, the printer 26 may be coupled to the communication network 42 and may provide print services to all of the computers 10 coupled to the network 42.

As described with respect to FIG. 1, the printer 26 and computers 10 shown in FIG. 2 may be adapted to communicate wirelessly. Specifically, the network 42 may comprise a wireless communication network. For example, the printer 26 and computers 10 may be adapted to include wireless communication devices (not shown) that enable wireless communication via a wireless communication protocol such as Bluetooth. Alternatively, the computers 10 may be adapted to access the printer 26 via any other mode of communication such as a standard telephone line and a telephone modem.

Figure 3A:
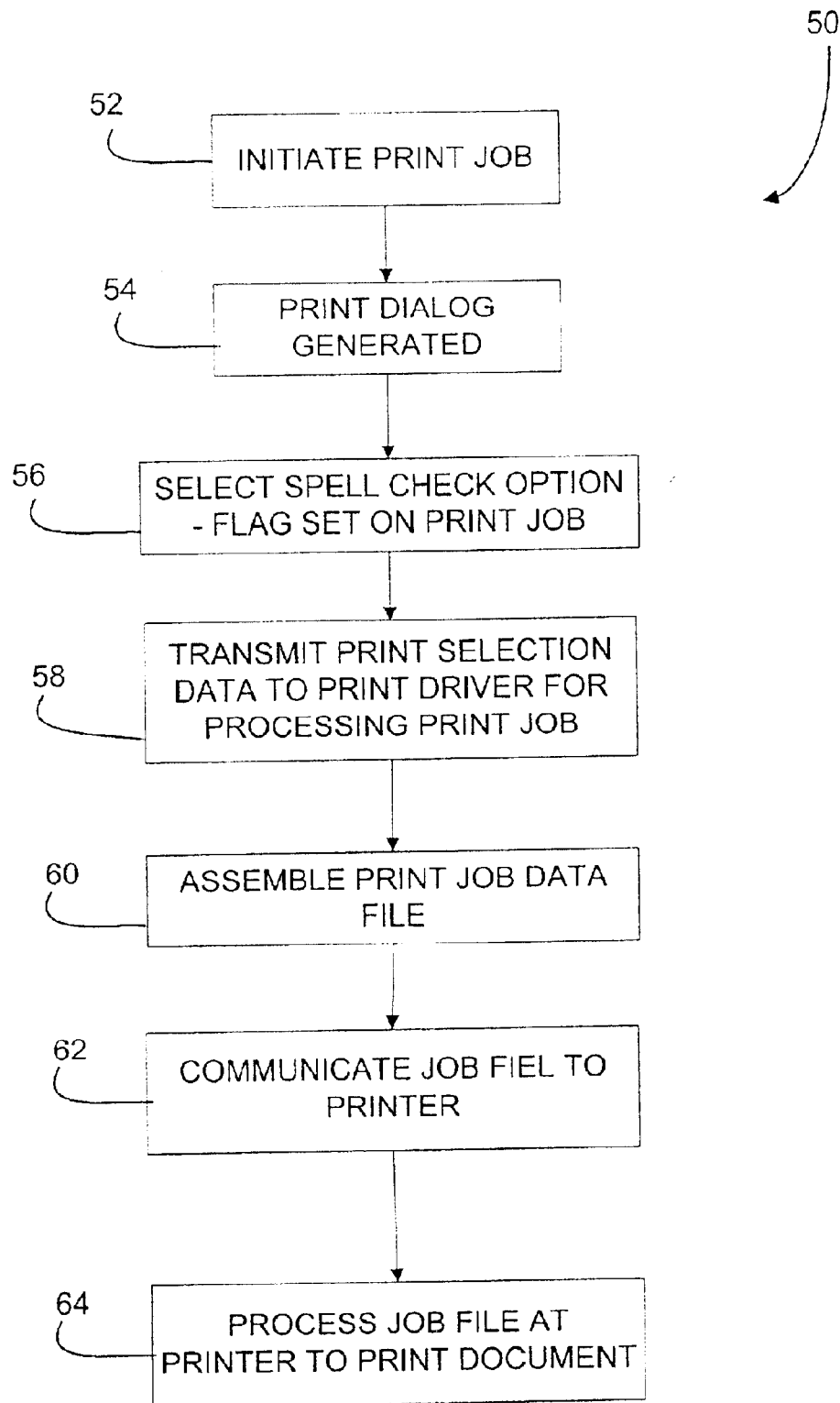
FIGS. 3(a)–(b) are a flow chart representing a method for providing the spell checking feature to the network computers via the print apparatus of FIGS. 1 and 2 according to a further aspect of the present invention; and, FIG. 4 is a flow chart representing a method for providing the spell checking feature to the network computers via the print apparatus of FIGS. 1 and 2 according to a still further aspect of the present invention.

Referring now to FIG. 3(a) and to FIGS. 1 and 2, the spell checking program 32 may be executed using a method 50 that begins when a user initiates a print job by selecting a print command associated with any of the software programs stored on the computer 10 (step 52). In response to the print command, the CPU 12 disposed in the computer 10 causes a print dialog window to appear on the computer monitor 18 (step 54). As will be appreciated by one having ordinary skill in the art, a print dialog window allows a user to select the format in which a document shall be printed and may be generated. For example, a print dialog window may include options that allow the user to specify whether the document file shall be printed in a portrait or landscape orientation, whether the entire document file shall be printed or only portions of the document file, and whether a single or multiple copies of the document file shall be printed.

In addition to the conventional print features enabled via the print dialog window described above, the print dialog window further includes an option for enabling the spell checking program 32. When the print dialog window appears, the user selects the spell checking option thereby causing a spell checking print job flag to be activated (step 56) and further selects any other desired print options via the print dialog window. It will be appreciated that as used herein the term "flag" is intended to refer to a logical operator. Other selected options may likewise result in other corresponding flags to be activated. Next, the user indicates that all of the appropriate print options have been selected by, for example, using the mouse 22 to select an appropriate one of the buttons displayed on the print dialog window. In response to the selection, the print dialog window is removed from the display and the information entered via the print dialog window is transmitted to the print driver 24 for processing the print job (step 58).

In processing the print job, the print driver 24 may assemble a "print job data file" (step 60). A "print job data file" as used herein comprises a digital data file that contains the textual data to be put into document form. The job file may additionally comprise data regarding format of the document text such as margins, character font, language, and the like. The job file may also be assembled using a protocol that the printer 26 will be able to print (e.g., document prepared in MS WORD format may be converted to a printer ready format such as PCL or postscript). The job file also comprises data conveying information input by the user through the print dialog display. This print dialog data comprises, for example, the spelling check flag. This data may be included in the job file in a seamless manner, or may be appended to the job file in a partitioned or otherwise distinct data portion, such as in a header.

Figure 3B:
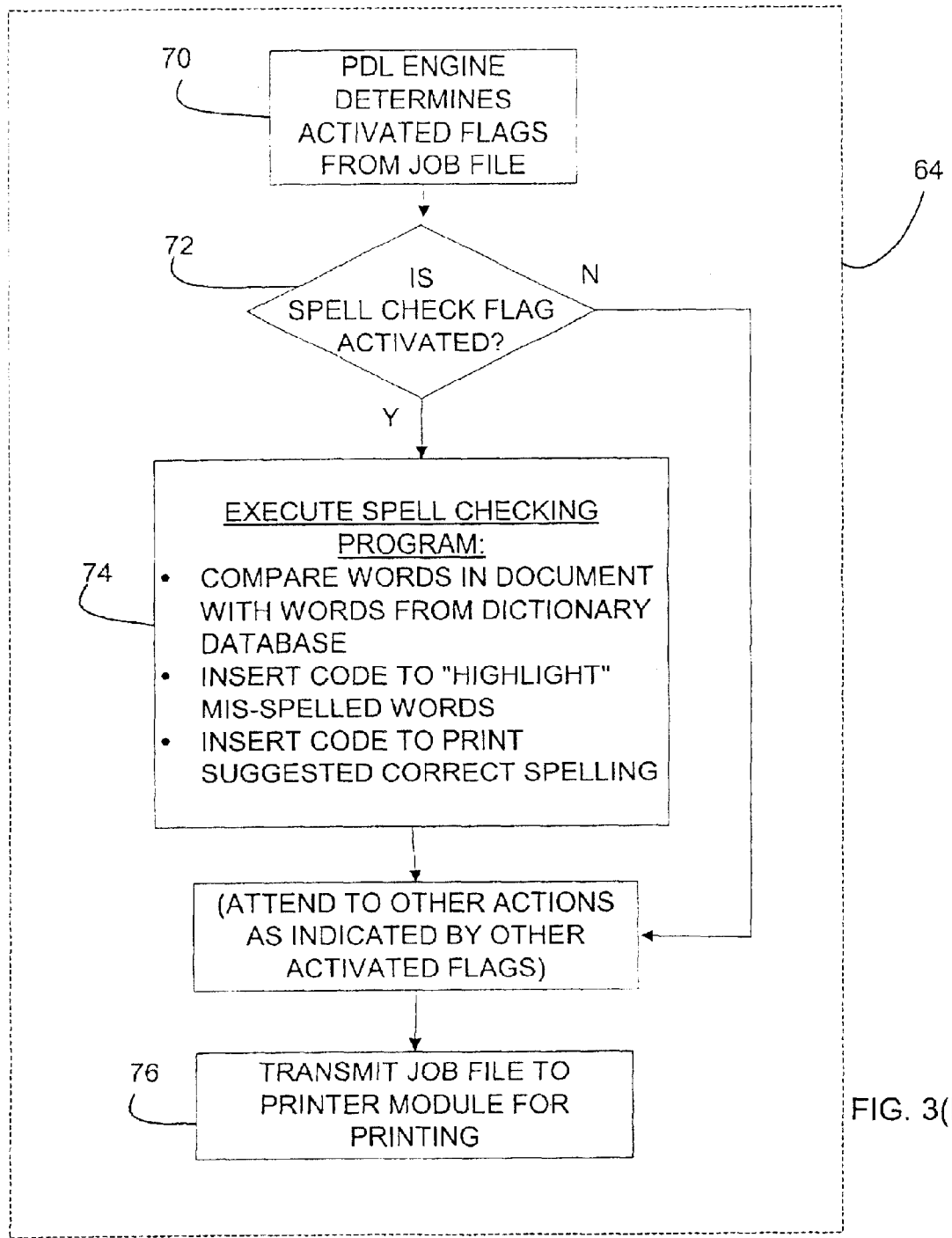

After assembly of the print job file is complete, the file is communicated to the printer 26 (step 62). Upon receiving the job file, the printer processor 30 then undertakes processing the file (step 62). Generally, processing of the file comprises interpreting the information contained in the job file to determine what the printed document should look like, and instructing the various components of the printer 26 as required to undertake the printing of the document. In so doing, and with reference now made to the flow chart of FIG. 3(b) that expands on step 62 of FIG. 3(a), the processor 30 may instruct the page description language engine 34 to determine from the job file whether specific actions should be taken (step 70). The page description language engine 34 identifies each print job flag incorporated into the job file in a header or the like and performs a set of functions necessary to implement the formatting feature associated with each print job flag.

Upon determining that the print job flag is activated indicating that spell checking has been enabled, the page description language engine 34 invokes the spell checking program 32 (step 74). The spell checking program 32, which may perform any of the conventional methods for spell checking, compares the terms included in the document file to a set of terms included in the dictionary database 33 to determine whether any of the terms in the document file have been misspelled.

Next, the spell checking program 32 causes one or more codes to be inserted into the document file to identify the misspelled terms. The inserted codes may include standard page description language codes that, when processed by the page description language engine program 34, cause the print engine 25 to print the document file with the misspelled terms "marked" so as to be identifiable by the user as being misspelled. As used herein, the term "marked" will be understood to indicate any manner of printing to convey the condition of being misspelled. For example, the codes may indicate that the misspelled terms are to be "marked" by highlighting, underlining, bolding, italicizing, coloring, or the like. In addition, the spell checking program 32 may insert codes that instruct the page description language engine 34 to cause the print engine 25 to print a suggested spelling for the misspelled term into the printed document at a location immediately following the misspelled term in a similar highlighted or the like manner. After all of the codes have been inserted and the page description language engine 34 has finished processing the document file, the print language description engine causes the print engine 25 to print the document file (step 76). It will be appreciated that the printer apparatus of the invention may of course also cause the page definition language engine 34 to determine whether additional flags are activated in the job file and to accordingly take additional actions as called for.

Figure 4:
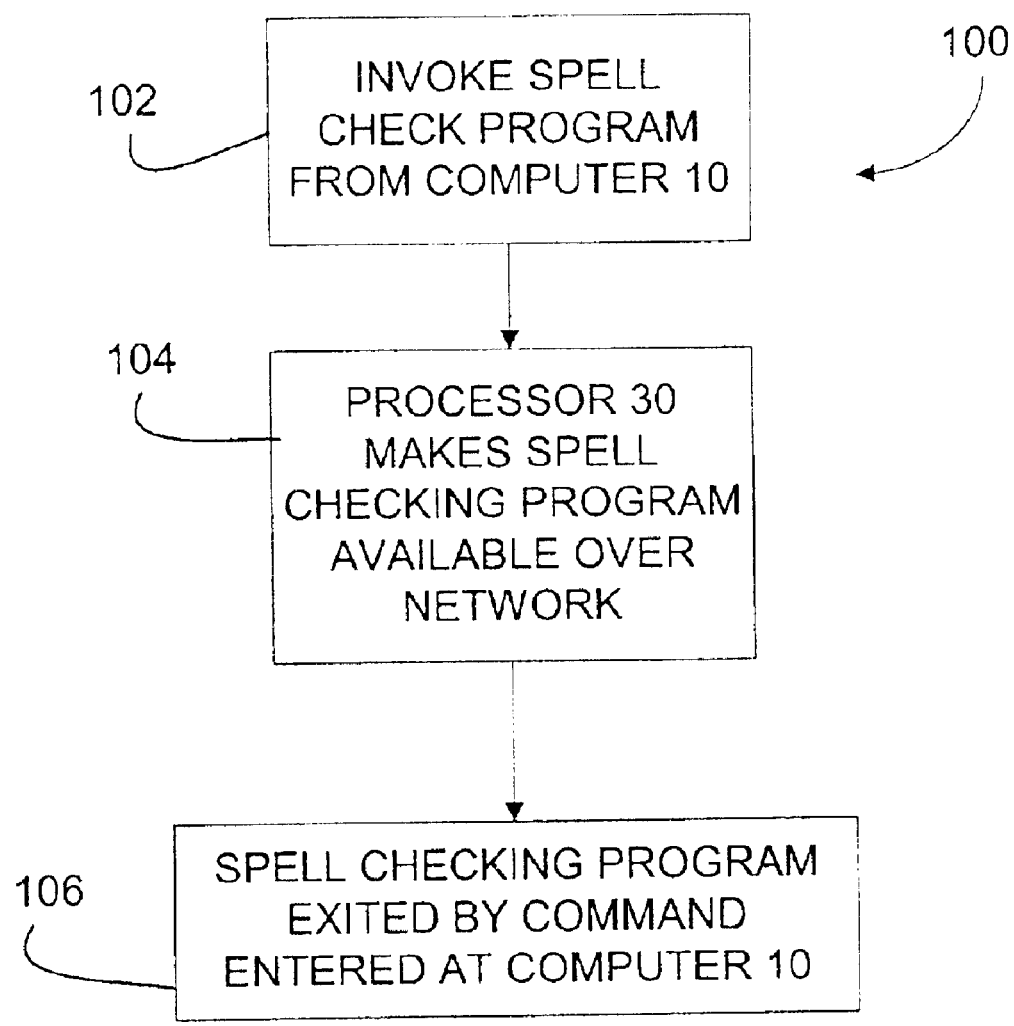

Referring now to FIG. 4 and to FIGS. 1 and 2, in an alternative embodiment, the printer 26 may be adapted to supply spell checking services to the computers 10 via the network 42 in much the same manner that a conventional network server is adapted to provide application services to network computers. Specifically, a method 100 for using the printer 26 to supply spell checking services to the computers 10 via the network 12 may begin when a user invokes the spell checking program 32 installed in the printer 26 at the computer 10 (step 102). The spell checking program 32 may be invoked using, for example, an icon displayed on the computer monitor 18 that, when selected via the mouse 22, instructs the computer 10 to communicate a request for spell checking service to the printer 26 via the network 42. Of course, the software required to implement the icon will have been previously installed in the computer 10. The processor 30 disposed in the printer 26 responds to the request by making the spell checking program 32 available for usage at the computer 10 in the same manner as a network server provides application services to the network computers 10 (step 104). Specifically, in invention embodiments, the spell checking program 32 may be configured to operate as a distributed service implemented as an object as specified under the Distributed Component Object Model specification (DCOM), the Common Request Broker Architecture (CORBA) specification, or the like.

As will be appreciated by one having ordinary skill in the art, a software program available to a plurality of computers as a DCOM or a CORBA object may be invoked and operated using any of a plurality of computers coupled to a network but is actually executed by a single network processor that communicates with the plurality of computers via the network. Moreover, a DCOM/CORBA enabled service is typically made available in a manner that is transparent to the user such that the user is not aware that the program providing the DCOM/CORBA enabled service resides on a remotely located network computer.

Thus, for example, when invoked via the computer 10, the spell checking program 32 residing in the printer 26 may cause a dialog window to be displayed on the computer monitor 18. The window may contain a set of boxes or data input fields by which the user may specify the portions of the document file to be spell checked. As will be understood by one having ordinary skill in the art, conventional spell checking programs and methods for implementing such programs are widely available and the methods associated with operating a software program as a D-COM or a CORBA are well known in the art. Accordingly, further detail regarding such programs is not necessary to be provided herein.

After using the spell checking program 32 at the computer 10, the user may exit the program by, for example, selecting a close option provided by the spell checking program 32 (step 106). The user's desire to exit the program is communicated to the processor 30 disposed in the printer 26 that in turn responds by halting execution of the spell checking program 32.

From the foregoing description, it should be understood that a print apparatus adapted to provide spell checking services has been shown and described, having many desirable attributes and advantages. In particular, the print apparatus provides spell checking services thereby eliminating the need to install a spell checking program 32 on a user's computer 10 and conserving the space available on the computer hard drive. In addition, the print apparatus supplies spell checking services for documents created using any software application.

While various embodiments of the present invention have been shown and described, it should be understood that other modifications, substitutions and alternatives are apparent to one of ordinary skill in the art.

What is claimed is:

1. A print apparatus adapted to provide a spell checking feature, said print apparatus comprising:
   a print engine for printing a document;
   a processor connected to said print engine,
   a memory connected to said processor;
   a spell checking program stored on said memory; and
   said processor operative to control said print engine and to receive and process an electronic representation of said document in a page description language including applying said spell checking program to said page description language electronic representation of said document.

2. The print apparatus of claim 1 wherein said spell checking program comprises instructions that when executed by said processor causes said processor to identify a set of words in said page description language electronic representation of said document that comprise spelling errors by comparing said set of words to words contained in a dictionary database stored on said memory.

3. The print apparatus of claim 2 wherein the apparatus further comprises a dictionary database of correctly spelled words stored in said memory, and wherein said spell checking program when executed by said processor identifies said set of words by comparing all words from said page description language electronic representation of said document with words in said dictionary database.

4. The print apparatus of claim 1 wherein said spell checking program is for use by a computer communicating with said print apparatus.

5. The print apparatus of claim 4 wherein said spell checking program comprises a distributed service to be implemented as an object as specified under one or more of the models from the group consisting of a distributed component object model and a common request broker architecture.

6. The print apparatus of claim 4 wherein the print apparatus may be connected to said computer over a communications network whereby said computer may be remotely located from the print apparatus.

7. The print apparatus of claim 4 wherein said computer is connected to the print apparatus by a wireless communications link.

8. A print apparatus adapted to provide a spell checking feature, said print apparatus comprising:
   a print engine for printing a document;
   a processor connected to said print engine, said print engine controlled by said processor; and
   a memory connected to said processor;
   a spell checking program stored on said memory, said spell checking program executable by said processor;
   a page description language engine;
   wherein said spell checking program comprises instructions that when executed by said processor causes said processor to identify a set of words in said document that comprise spelling errors by comparing said set of words to words contained in a dictionary database stored on said memory; and
   wherein said spell checking program when executed by said processor generates information identifying said set of words and supplies said information to said page description language engine and wherein said page description language engine causes said print engine to print said document with said set of words marked to indicate misspelling.

9. The print apparatus of claim 8 wherein said page description language engine is integrated with said spell checking program.

10. The print apparatus of claim 8 wherein said marked words are marked using a format selected from the group consisting of: bolded text, italicized text, colored text, and underlined text.

11. A print apparatus adapted to provide a spell checking feature, said print apparatus comprising:
   a print engine for printing a document;
   a processor connected to said print engine, said print engine controlled said processor;
   a memory connected to said processor;

a spell checking program stored on said memory, said spell checking program executable by said processor;

wherein said spell checking program is for use by a computer communicating with said print apparatus; and wherein said processor is for receiving and processing print job files from said computer communicating with the print apparatus, and wherein said processor executes said spell checking program when said print job file has a spell check flag activated.

12. The print apparatus of claim 11 wherein the print apparatus further comprises a printer driver program, said printer driver program for causing a dialog with a user, said dialog comprising an option for activating said spell check flag.

13. A print apparatus adapted to provide a spell checking feature, said print apparatus comprising:

a print engine for printing a document;

a processor connected to said print engine, said print engine controlled by said processor;

a memory connected to said processor;

a spell checking program stored on said memory, said spell checking program executable by said processor;

wherein said spell checking program is for use by a computer communicating with said print apparatus;

wherein the print apparatus may be connected to said computer over a communications network whereby said computer may be remotely located from the print apparatus; and wherein said communications network supports internet protocol communications, and wherein said processor is for processing an internet protocol print job file, said job file comprising a spell check flag, said processor executing said spelling check program when said spell check flag is activated.

14. A print apparatus for connection to a computer over a network, the print apparatus adapted to provide a spell checking feature, the print apparatus comprising:

a print engine for printing a document file;

a processor connected to said print engine, said processor for processing a print job file, said print job files having a spell check flag and having a document file, said processor controlling said print engine;

a memory device connected to said processor, said memory device for storing a spell checking program, a page display language engine, and a dictionary database; and wherein said processor is for executing said spell checking program stored in said memory device when said print job file spell check flag is activated, said spell checking program when executed operating to identify a set of misspelled words in said document file by comparing words in said document file with words from said dictionary database, and instructing said page display language engine to mark said set of misspelled words in a printed document.

15. A computer program product comprising a computer readable code stored on a computer readable medium, the computer readable code when executed causing a printer apparatus to:

accept a page description language input print job file;

process said print job file including executing a spelling check program for identifying a set of misspelled words in said print job file.

16. The computer program product of claim 15 wherein said print job file includes a spell check flag, and wherein the code for causing a printer apparatus to process said print job file includes code for causing the printer apparatus to execute said spelling check program when said spell check flag is activated.

17. The computer program product of claim 15 wherein said spelling check program when executed identifies said set of misspelled words by comparing said words to a dictionary database stored on said printer apparatus memory.

18. The computer program product of claim 15 wherein said spelling check program comprises a model selected from the group consisting of: a distributed component object model and a common request broker architecture.

* * * * *